J. W. LOPER.
GENERATOR.
APPLICATION FILED APR. 15, 1912.
1,088,432.
Patented Feb. 24, 1914.
2 SHEETS—SHEET 1.
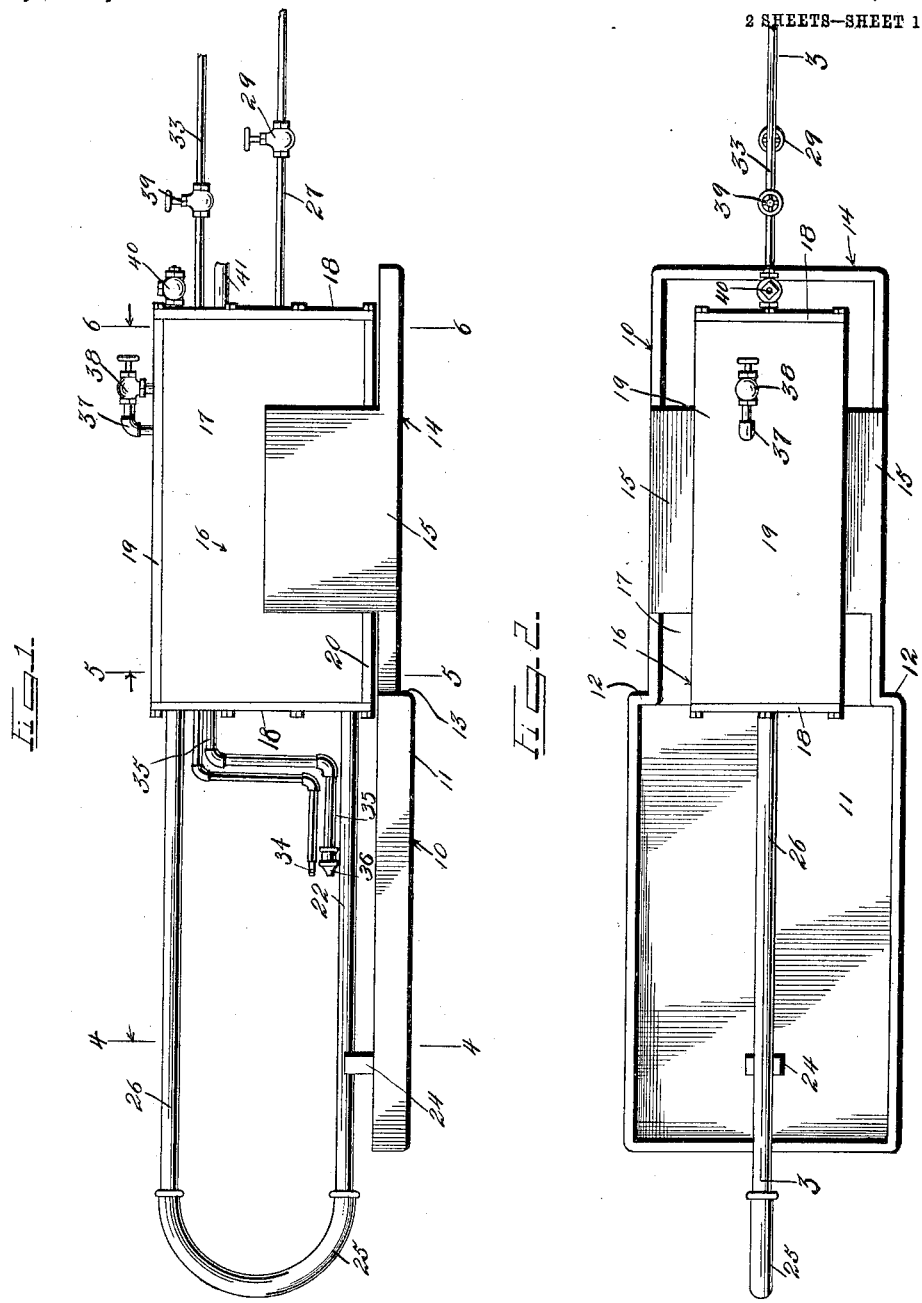
Witnesses
Inventor
John W. Loper
By
Attorneys J. W. LOPER.
GENERATOR.
APPLICATION FILED APR. 15, 1912.
1,088,432.
Patented Feb. 24, 1914.
2 SHEETS—SHEET 2.
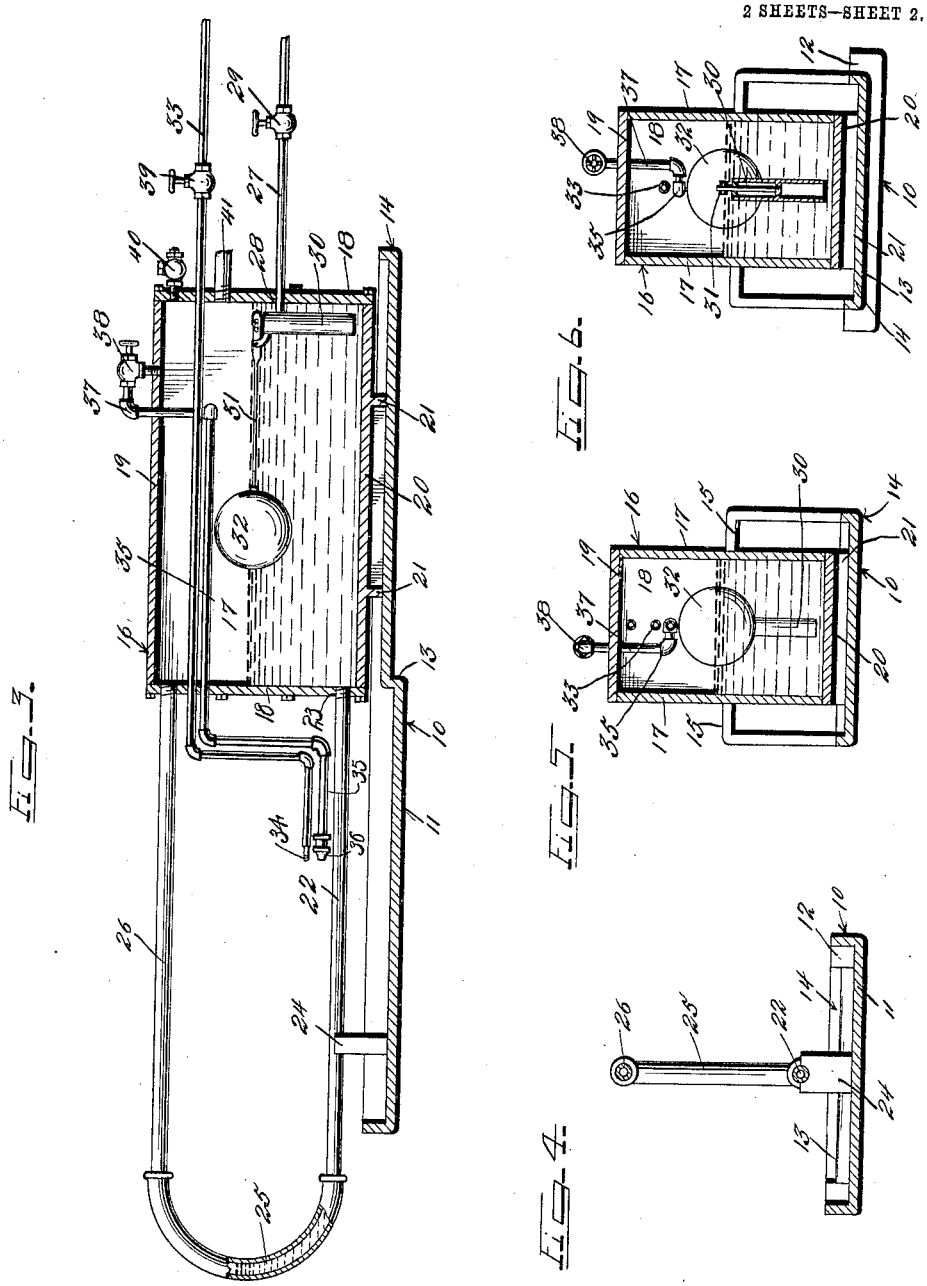
Witnesses
Inventor
John W. Loper
By
Attorneys

UNITED STATES PATENT OFFICE.

JOHN W. LOPER, OF LONGBEACH, CALIFORNIA, ASSIGNOR OF ONE-HALF TO WALLACE V. BARTOW, OF LONGBEACH, CALIFORNIA.

GENERATOR.

1,088,432.  Specification of Letters Patent.  Patented Feb. 24, 1914.

Application filed April 15, 1912. Serial No. 690,913.

*To all whom it may concern:*

Be it known that I, JOHN W. LOPER, a citizen of the United States, residing at Longbeach, in the county of Los Angeles, State of California, have invented certain new and useful Improvements in Generators; and I do hereby declare the following to be a full, clear, and exact description of the invention, such as will enable others skilled in the art to which it appertains to make and use the same.

This invention relates to new and useful improvements in generators and more especially to that class adapted for the purpose of generating steam.

An object of this invention is the provision of a steam generator such as described which employs the use of a receptacle adapted to contain water and means for transforming the water into steam.

Another object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangements of parts to be hereinafter more fully described, claimed and illustrated in the accompanying drawings, in which:—

Figure 1 is a side elevation of my invention. Fig. 2 is a top plan view thereof. Fig. 3 is a longitudinal sectional view taken on the line 3—3 of Fig. 2. Fig. 4 is a transverse sectional view taken on the line 4—4 of Fig. 1. Fig. 5 is a similar view taken on the line 5—5 of Fig. 1, and Fig. 6 is a similar view taken on the line 6—6 of Fig. 1.

Referring to the accompanying drawings by similar characters of reference, the numeral 10 designates generally my improved generator, which consists of a firing pan 11 of substantially rectangular formation, the same being reduced at its opposite side and bottom as at 12 and 13 at one end thereof producing a reduced extension 14 of substantially the same length but less in width and height than the body of the pan 11.

The upper edges of the reduced extension 14 are formed with inwardly directed flanges 15 for engagement with, and to support a casing or steam chest 16 of substantially rectangular formation and comprising opposite side and end walls 17 and 18 connected at their upper edges by a top 19 and at their lower edges by a bottom 20 formed with depending transverse ribs 21 which engage the bottom of the reduced extension 14 serving to support the receptacle 16 in spaced relation therefrom.

A pipe 22 projects from the inner end wall 18 and extends in parallel relation to the sides and bottom of the pan 11 in equispaced relation therefrom and through an opening 23 formed in the end wall of the said pan, the said pipe being supported intermediate the ends of the pan 11 and receptacle 16 by a bracket 24. The outer end of the pipe 22 is curved upwardly as at 25 and then extended backwardly upon itself in superimposed relation to the part designated by the numeral 22 as at 26 terminating interior of the compartment formed by the receptacle or casing 16.

An inlet pipe 27 passes through an opening 28 formed in the outer end 18 and is controlled by an outer manually operable valve 29 and an inner automatic valve 30, to the stem of which is attached an operating rod 31 carrying attached to its free end a float 32.

A fuel pipe 33 extends through the casing 16 terminating at one end in a burner 34 disposed below the extension 26 of the pipe 22 while extending in parallel relation to this pipe 33 is a jet 35 equipped at its terminal with a spraying nozzle 36 disposed below the burner 34.

The jet 35 communicates through a pipe 37 with the interior of the casing 16, and this said pipe 37 together with the pipe 33 is controlled by valves 38 and 39.

The casing or steam chest 16 is equipped with a safety valve 40 which controls the amount of steam therein preventing any undesired excess pressure while the steam may be taken therefrom through a valve controlled outlet 41 for any desired purpose.

The operation of the device is as follows: The valve 29 is first opened which permits the necessary amount of water to enter the casing 16, the said amount being at all times retained at the desired level through the assistance of the valve 30 controlled by means of the rod 31 and float 32. The water flows from the casing through the pipe 22 and extension 25 thereof until it reaches an elevation within the said extension 25 corresponding to the elevation within the receptacle 16. The firing pan 11 is then filled with oil or other similar burning substance and ignited which obviously causes the vaporization of the water contained within the pipe 22 causing the said vapor to pass through the extension 26 back into the casing 16. The valve 39 is then opened which permits the burning fluid to pass therethrough into the burner 34 which is then ignited. The valve 38 is then opened which causes a spray of steam to be ejected from the nozzle 36 thus driving the flame against the pipe 22 and the extensions thereof causing the water contained therein to be vaporized and directed back into the casing 16.

An excess pressure of steam within the casing 16 is controlled by the valve 40, while any quantity of the steam may be removed therefrom through the outlet 41. It should be understood in this connection that various minor changes in the details of construction can be resorted to within the scope of the appended claims without departing from or sacrificing any of the advantages of the invention.

From the foregoing disclosures taken in connection with the accompanying drawings it will be manifest that a device of the nature described is provided which will fulfil all of the necessary requirements of such a device.

Having thus fully described this invention what I claim as new and desire to protect by Letters Patent, is:—

1. The combination with a firing pan of a casing disposed thereon, a pipe having its opposite ends communicating with the casing, an inlet pipe leading to the casing, means for controlling said inlet, a burner supported adjacent the casing, and disposed adjacent said pipe, and a discharge nozzle located adjacent the burner.

2. The combination with a firing pan, of a casing disposed thereon, a pipe communicating at its ends with the casing and supported above the firing pan, a valve controlled inlet pipe communicating with the casing, a burner disposed adjacent the first mentioned pipe, a nozzle located adjacent the burner and a pipe leading from said nozzle and communicating with the casing.

3. The combination with a firing pan, of a steam casing disposed thereon, a pipe supported above the firing pan and communicating at its opposite ends with the casing, an inlet pipe leading into said casing, a valve controlling the passage of fluid through said inlet pipe, a float automatically actuating said valve, a fuel pipe, a burner secured thereto and disposed between the extension of the first mentioned pipe, a steam pipe communicating with the steam casing, a nozzle attached to the steam pipe and located adjacent the burner, valves controlling the steam pipe and fuel pipe and an outlet for the steam casing.

4. An oil burning apparatus comprising a reservoir, a U-tube having its open ends extending into said reservoir one above another, a water inlet pipe for said reservoir, valve means on said pipe within said reservoir, means on said valve for automatically maintaining a definite water level in said reservoir, a burner, means for conducting steam from said reservoir to said burner, and means for supplying oil to said burner.

In testimony whereof, I affix my signature, in presence of two witnesses.

JOHN W. LOPER.

Witnesses:
R. H. COCH,
RAY MILLETT.

Copies of this patent may be obtained for five cents each, by addressing the "Commissioner of Patents, Washington, D. C."